Aug. 4, 1942.  T. SCHMIDT  2,291,923
VEHICLE SIGNAL ACTUATING DEVICE
Filed Dec. 1, 1939  2 Sheets-Sheet 1
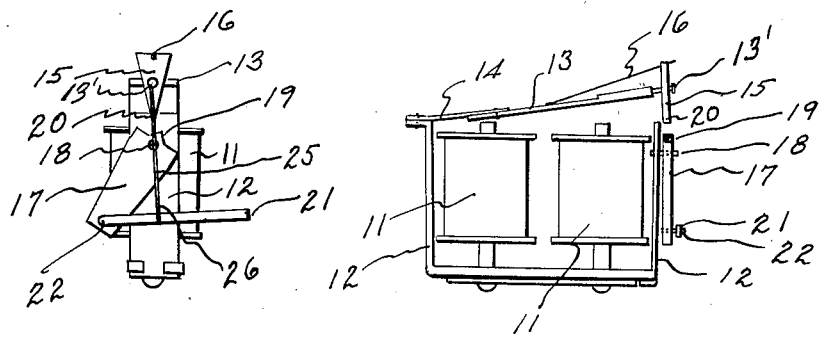
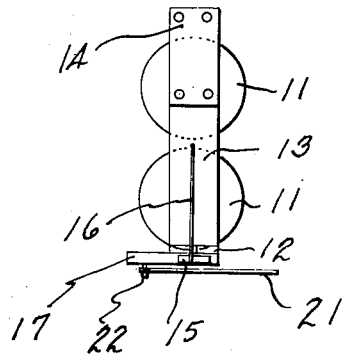
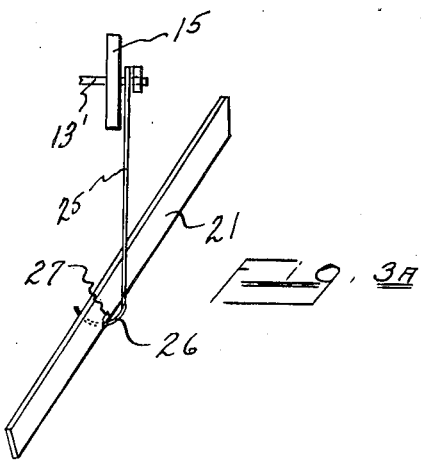
INVENTOR.
BY Theodor Schmidt
Robert A. Sloman
ATTORNEY.

Aug. 4, 1942.  T. SCHMIDT  2,291,923
VEHICLE SIGNAL ACTUATING DEVICE
Filed Dec. 1, 1939   2 Sheets-Sheet 2

INVENTOR.
Theodor Schmidt
BY Robert A. Sloman
ATTORNEY.

Patented Aug. 4, 1942

2,291,923

UNITED STATES PATENT OFFICE 2,291,923

VEHICLE SIGNAL ACTUATING DEVICE

Theodor Schmidt, Detroit, Mich.

Application December 1, 1939, Serial No. 307,009

2 Claims. (Cl. 175—336)

My invention relates to a vehicle signal device for indicating contemplated right and left turns; and more particularly, relates to electromagnetic devices for actuating signal arms.

Heretofore there have been costly and complicated signal mechanisms; also said devices have not been entirely satisfactory as to visibility.

It is the object hereof to provide an electrically operated semaphore device for vehicles which requires no steady current for the operation thereof; but instead requires only intermittent electrical impulses as and when it is desired to operate the signal arms or to render same inoperative.

It is the object hereof to provide electrically operated semaphore devices for vehicles which are designed to be recessed in inoperative position entirely within the vehicle body or which may, if desired, be disposed upon the outside thereof.

It is the further object to provide a combination of vehicle signal arms and novel mechanism for actuating said arms.

For a better understanding of the invention and the arrangement of parts and combinations thereof, reference should be had to the following more specific description, claims and appended drawings of which:

Figure 1 is an end elevation of the actuating device.

Figure 2 is a side elevation thereof.

Figure 3 is a plan view of the same.

Figure 3A is a fragmentary perspective view of the lever support.

Figure 4 is a side elevation of the signal arm in its casing.

Figure 5 is a plan view of the arm and actuating device.

The drawings herein show a preferable embodiment of my invention by example. However, inventor does not intend to limit the invention thereby, the scope of which will be defined by the claims hereafter.

Referring to the drawings, and particularly to Figures 1, 2, and 3, it will be seen that the arm actuating device consists of electromagnetic coils 11 disposed within and upon a supporting casing 12, suitable electric contact to be provided therefor as hereinafter described. The magnetic bar 13 resiliently secured to the upright wall of the casing 12 by means of the intermediate leaf spring 14 is in alignment with the electromagnetic coils 11 and is actuated and drawn downwardly thereby when electric current is furnished to said coils.

The triangularly shaped clip 15 is loosely pivoted to bar 13 at point 13', being resiliently mounted thereon by means of the intermediate wire spring 16 secured on the top of magnetic bar 13.

Arm 17 pivotally supported to the other upright portion of the casing 12 by pin 18 and downwardly depending therefrom, has centrally positioned thereupon and integral therewith an anvil 19. The angularly disposed side portions thereof are designed to be alternately engaged by or to register with the pointed portion 20 of the clip 15 as said clip is alternately brought to engagement with a side of said anvil 19. This is accomplished when the magnetic bar 13 is drawn downwardly by the electromagnets 11. A lever 21, for actuating the signal arm 22', pivoted to the clip 17 at point 22 is designed to reciprocate laterally when clip 17 is angularly rotated about its axis 18 in the manner hereinafter to be more fully described.

Referring to Figure 5 which is a plan view of the arm and actuating mechanism showing dotted lines to represent operative position, it will be seen that the lever 21 is pivoted on its opposite end to the signal arm 22' at point 23, eccentric to the vertical axis 24 of said signal arm.

Consequently as the lever 21 is caused to move transversely and laterally with respect to the actuating device, the signal arm 22' is caused to rotate in a horizontal plane upon its axis 24.

As will be seen from the drawings, each time the electromagnet coils 11 receive an electric impulse, the magnetic cross bar 13 is drawn downwardly, and, similarly when the current is cut off, said bar 13 is caused to rise vertically by means of the leaf spring 14.

While in inoperative position, the arm actuating device appears as illustrated in Figures 1 and 5 with the triangular clip 15 in raised position. It will be noted further that the arm 17 has been rotated to the extreme left with the loosely connected bar 21, thereby maintaining the signal arm in inoperative position.

An electric impulse through coils 11 sends clip 15 downward where its point 20 engages the left side of the anvil 19 and rides down its inclined surface, it being noted that said clip is suitably pivoted to magnetic bar 13, consequently moving with it. The clip 15 resiliently pivots on its axis 13' and engages the top portion of arm 17 at a point eccentric with axis 18. Consequently said arm 17 is caused to revolve counterclockwise about axis 18 causing the lever 21 to move transversely to the right in turn causing signal arm 22' to move outwardly.

The dotted line portions of Figure 5 illustrate the actuating device and signal semaphore in operative position with the arm 17 rotated counterclockwise to the right about its own axis 18.

When it is desired to return the signal arm to inoperative position an electric switch is actuated whereby the electro-magnetic coil receives another electric impulse. Consequently the magnetic bar 13 is again caused to descend carrying therewith the pivoted triangularly shaped clip 15, where the sharp point 20 engages the right edge of the anvil 19 and rides down its inclined surface.

The clip 15 through wire springs 16 resiliently pivots on its axis 13' to the right and engages the top portion of arm 17 at a point eccentric to the axis 18. Consequently the arm 17 by action of clip 15 is caused to revolve in a clockwise direction about its axis 18 causing the connecting bar 21 to move to the left which in turn causes the signal arm to move back into inoperative position.

The connecting bar 21 may be further supported and held in inoperative position by means of the wire stirrup 25 suspended from the axis 13', as shown in Figure 3A. The lower hooked portion 26 engages the underside of lever 21 in a suitable notch at point 27, whereby said lever is latched.

The arm 22' provided with transparent side portions 28 has disposed therein suitable illuminating means 29 with the proper electrical contact therefor.

It will be noted that the decided advantage of this device is the fact that the arm actuating device does not require a continuous current, but instead requires only intermittent impulses or passages of electric current, as and when it is desired to operate the signal, or when thereafter it is desired to render same inoperative.

Referring again to Figure 5, it will be seen that the signal arm 22 in inoperative position is entirely disposed within its retainer 43 within the opening provided therein which may preferably be an opening in the vehicle body. On the other hand said device may be disposed entirely on the outside of the vehicle body.

Having described my invention, reference should now be had to the claims which follow for determining the scope hereof.

I claim:

1. An actuating device comprising a plurality of coils, magnetic means responsive to electro-magnetic forces therein, lever means operatively suspended from said magnetic means, pivoted means alternately registering therewith and responsive to said lever means, connecting means secured to the aforesaid pivoted means for intermittently imparting reciprocable motion, and latching means suspended and pivoted from said magnetic means for operative engagement with said pivoted and connecting means.

2. An actuating device comprising coils, a magnetic bar resiliently suspended above and responsive to electro-magnetic forces therein, a lever pivotally and resiliently mounted on said bar, having a converging lower extremity, a lever arm pivoted directly below having upon its upper portion a projecting anvil with angularly diverging sides for alternately registering with the converging lever as the same is intermittently lowered, to rotate said arm about its axis in alternate directions, a connecting bar pivoted to said arms remote from its axis for intermittently imparting motion, and a stirrup suspended and pivoted from the end portion of the magnetic bar and engaging in a notch in the connecting bar when the magnetic bar is unoperated and the connecting bar is in one position to latch the latter in that position.

THEODOR SCHMIDT.